United States Patent
Rajkumar et al.

(10) Patent No.: US 7,188,216 B1
(45) Date of Patent: Mar. 6, 2007

(54) METHOD AND SYSTEM FOR AN EXTENSIBLE CACHING FRAMEWORK

(75) Inventors: N. Isaac Rajkumar, Austin, TX (US); Puhong You, Cedar Park, TX (US); David Dean Caldwell, Dripping Springs, TX (US); Brett J. Larsen, Austin, TX (US); Jamshid Afshar, Austin, TX (US); Conleth O'Connell, Austin, TX (US)

(73) Assignee: Vignette Corporation, Austin, TX (US)

( * ) Notice: Subject to any disclaimer, the term of this patent is extended or adjusted under 35 U.S.C. 154(b) by 249 days.

(21) Appl. No.: 10/733,798

(22) Filed: Dec. 11, 2003

Related U.S. Application Data

(60) Provisional application No. 60/433,408, filed on Dec. 13, 2002.

(51) Int. Cl.
*G06F 12/00* (2006.01)
(52) U.S. Cl. ............... 711/118; 711/133; 711/159; 713/180; 715/513; 709/217; 709/218; 709/219
(58) Field of Classification Search ........... 711/118, 711/133, 159; 715/513, 213; 709/217–219; 713/180
See application file for complete search history.

(56) References Cited

U.S. PATENT DOCUMENTS

| | | | |
|---|---|---|---|
| 5,202,982 A | 4/1993 | Gramlich et al. | |
| 5,473,772 A | 12/1995 | Halliwell et al. | |
| 5,504,879 A | 4/1996 | Eisenberg et al. | |
| 5,740,430 A | 4/1998 | Rosenberg et al. | |
| 5,946,697 A * | 8/1999 | Shen ........................ | 715/513 |
| 6,029,175 A | 2/2000 | Chow et al. | |
| 6,151,624 A | 11/2000 | Teare et al. | |
| 6,178,461 B1 * | 1/2001 | Chan et al. ................. | 709/247 |
| 6,192,415 B1 | 2/2001 | Haverstock et al. | |
| 6,198,824 B1 | 3/2001 | Shambroom | |
| 6,272,492 B1 | 8/2001 | Kay et al. | |
| 6,408,360 B1 | 6/2002 | Chamberlain et al. | |
| 6,571,246 B1 | 5/2003 | Anderson et al. | |
| 6,591,266 B1 | 7/2003 | Li et al. | |
| 6,651,217 B1 | 11/2003 | Kennedy et al. | |
| 6,697,844 B1 | 2/2004 | Chan et al. | |
| 6,701,428 B1 | 3/2004 | Harvey, III et al. | |
| 6,754,621 B1 | 6/2004 | Cunningham et al. | |
| 6,850,941 B1 | 2/2005 | White et al. | |
| 7,024,452 B1 * | 4/2006 | O'Connell et al. ......... | 709/203 |
| 2001/0032254 A1 | 10/2001 | Hawkins | |
| 2001/0034771 A1 | 10/2001 | Hutsch et al. | |
| 2002/0065912 A1 | 5/2002 | Catchpole et al. | |
| 2002/0165877 A1 | 11/2002 | Malcolm et al. | |

(Continued)

*Primary Examiner*—Matthew Kim
*Assistant Examiner*—Hetul Patel
(74) *Attorney, Agent, or Firm*—Sprinkle IP Law Group

(57) ABSTRACT

Systems and methods which provide an extensible caching framework are disclosed. These systems and methods may provide a caching framework which can evaluate individual parameters of a request for a particular piece of content. Modules capable of evaluating individual parameters of an incoming request may be added and removed from this framework. When a request for content is received parameters of the request can be evaluated by the framework and a cache searched for responsive content based upon this evaluation. If responsive content is not found in the cache, responsive content can be generated and stored in the cache along with associated metadata and a signature formed by the caching framework. This signature may aid in locating this content when a request for similar content is next received.

35 Claims, 3 Drawing Sheets

U.S. PATENT DOCUMENTS

| | | |
|---|---|---|
| 2002/0178187 A1 | 11/2002 | Rasmussen et al. |
| 2002/0194219 A1* | 12/2002 | Bradley et al. ............. 707/506 |
| 2003/0078964 A1 | 4/2003 | Parrella et al. |
| 2003/0217117 A1 | 11/2003 | Dan et al. |
| 2004/0030697 A1 | 2/2004 | Cochran et al. |
| 2004/0030746 A1* | 2/2004 | Kavacheri et al. .......... 709/203 |
| 2004/0205165 A1 | 10/2004 | Melamed et al. |
| 2004/0205452 A1 | 10/2004 | Fitzsimmons et al. |

* cited by examiner

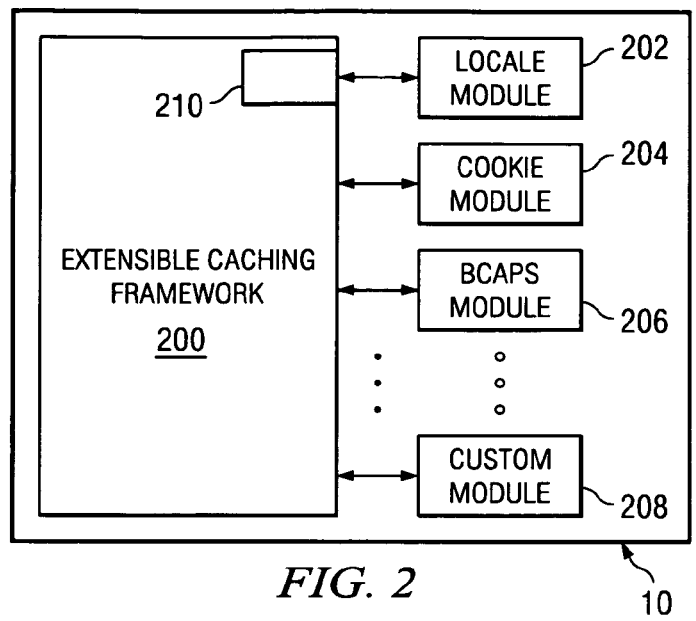
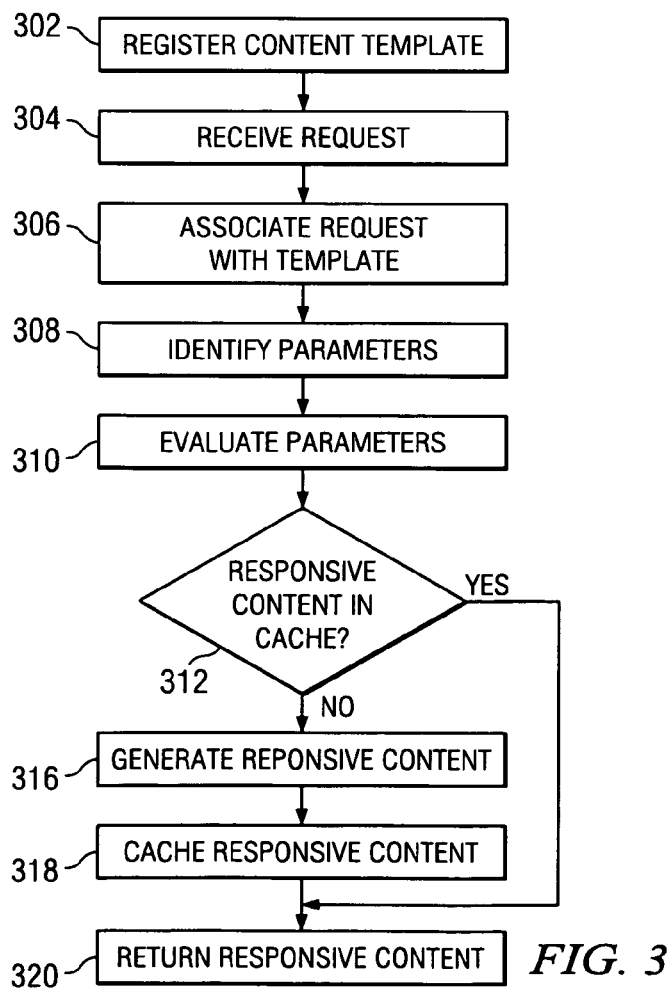
FIG. 2
FIG. 3

METHOD AND SYSTEM FOR AN EXTENSIBLE CACHING FRAMEWORK

RELATED APPLICATIONS

This application claims a benefit of priority under 35 U.S.C. § 119(e) to U.S. Patent Application No. 60/433,408 entitled "Extensible Framework for Caching and Configurable Caching Parameters" by N. Isaac Rajkumar, Conleth O'Connell, Jamshid Afshar, Puhong You, Brett J. Larsen and David Dean Caldwell; filed Dec. 13, 2002. This application is related to United States Patent Application No. 10/733,742 entitled "Method and System for Automatic Cache Management" by Conleth O'Connell, Mark Scheevel, and N. Isaac Rajkumar; filed Dec. 11, 2003. All applications cited within this paragraph are assigned to the current assignee hereof and are fully incorporated herein by reference.

TECHNICAL FIELD OF THE INVENTION

This invention relates in general to methods and systems for managing content, and more particularly, to methods and systems for caching data associated with web site requests.

BACKGROUND OF THE INVENTION

Communication of data over computer networks, particularly the Internet, has become an important, if not essential, way for many organizations and individuals to disseminate information. The Internet is a global network connecting millions of computers using a client-server architecture in which any computer connected to the Internet can potentially receive data from and send data to any other computer connected to the Internet. The Internet provides a variety methods in which to communicate data, one of the most ubiquitous of which is the World Wide Web. Other methods for communicating data over the Internet include e-mail, usenet newsgroups, telnet and FTP.

The World Wide Web is a system of Internet servers, typically called "web servers", that support the documents and applications present on the World Wide Web.

Documents, known as web pages, may be transferred across the Internet according to the Hypertext Transfer Protocol ("HTTP") while applications may be run by a Java virtual machine present in an internet browser. Web pages are often organized into web sites that represent a site or location on the world wide web. The web pages within a web site can link to one or more web pages, files, or applications at the same web site or at other web sites. A user can access web pages using a browser program and can "click on" links in the web pages being viewed to access other web pages.

Each time the user clicks on a link, the browser program generates a request and communicates it to a web server hosting web pages or applications associated with the web site. The web server retrieves the requested web page or application from an application server or Java server and returns it to the browser program. Web pages and applications can provide a variety of content, including text, graphics, interactive gaming and audio and video content.

Because web pages and associated applications can display content and receive information from users, web sites have become popular for enabling commercial transactions. As web sites become more important to commerce, businesses are increasingly interested in quickly providing responses to user's requests. One way of accelerating responses to requests on a web site is to cache the web pages or applications delivered to the requesting user in order to allow faster access time to this content when it is next requested.

Current caching methods, however, typically provide very limited functionality. This is because they only provide cached content, but do not link the cached content to specific aspects of each individual request to which the content is responsive, such as the user's locale, or browser capabilities. Additionally, when an identical request is presented content may be served from the cache, even though this content may have been updated at the application server in the intervening time span; or content responsive to the request must once again be generated and cached, delaying the response to the request.

Thus, while current web site caching systems may cache web pages and applications, they provide little or no information which relates the cached page or application to the associated request. In other words, current caching systems may not have keys individually tailored to the web page or application being cached. Furthermore, current web caching systems do not have the ability to cache and deliver pages and applications based upon a user's browser's capabilities. Therefore, content cannot be specifically tailored to both a user's needs and capabilities. In addition, current caching methodologies do not provide an adequate method for updating content stored in the cache without receiving an identical request from the user.

Thus, while current caching system allows some degree of performance enhancement, they provide neither a framework for a caching mechanism based upon request parameters which may be tailored and expanded to suit the needs of the web site provider nor a way to update content stored in the cache without receiving a request from a user.

SUMMARY OF THE INVENTION

Systems and methods for an extensible caching framework are disclosed. These systems and methods may provide a caching framework which can evaluate individual parameters of a user request based upon the content requested. Furthermore, this caching framework may be made extensible by allowing the addition and removal of modules capable of evaluating an individual parameter of an incoming request. One module may be responsible for allowing the evaluation of the capabilities of a browser from which a request was issued. These systems and methods may associate an incoming request with a template corresponding to requested content. The parameters to which this content is sensitive can then be evaluated using the extensible caching framework and a cache searched for responsive content based upon this evaluation. If responsive content is not found in the cache the request may be evaluated and responsive content generated. This content can then be cached along with a signature formed by the extensible caching framework in order that the responsive content may be located and delivered by the caching framework when a request for this content is next received.

In some embodiments, a module is registered with the caching framework and a parameter evaluated with the module.

In other embodiments, the parameter and the module pertain to capabilities of a browser initiating the request, the parameter is a user-agent string extracted from a header in the request, and the module evaluates the capabilities of the browser using an extensible markup language file by mapping the user-agent string to a list of browser capabilities.

In another embodiment, the signature is created from the module's evaluation.

In yet other embodiments, a template pertaining to the content is registered with the caching framework.

In associated embodiments, the template may define parameters to be evaluated in caching content.

In still other embodiments, template metadata and request metadata are stored in the cache, wherein the template metadata and request metadata are associated with the responsive content.

These, and other, aspects of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein identical reference numerals designate the same components. The invention may be better understood by reference to one or more of these drawings in combination with the description presented herein. It should be noted that the features illustrated in the drawings are not necessarily drawn to scale.

FIG. 2 is an architectural diagram of an extensible caching framework.

FIG. 3 is a flow diagram for a particular embodiment of an extensible caching framework.

DETAILED DESCRIPTION

Figure 1:
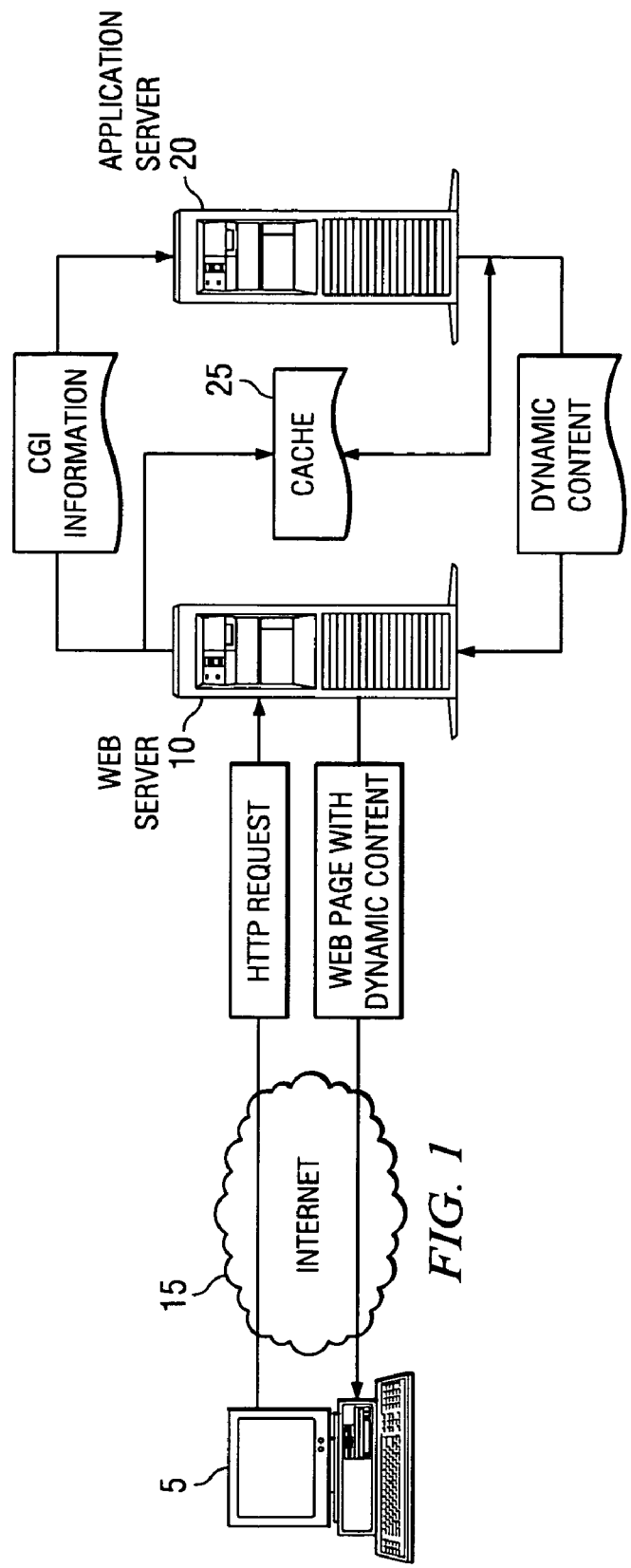
FIG. 1 is a diagrammatic representation of a system of caching content at a web site.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

A few terms are defined or clarified to aid in understanding the descriptions that follow. A network includes a set of server and client computers interconnected over a publicly available medium (e.g., the Internet) or over an internal (company-owned) system. A user at a client computer may gain access to the network using a network access provider. A user may request various content over this network. Content may be an application or piece of data provided by a web site such as an HTML page, Java application or the like. In many cases, one piece of content may be assembled from other pieces of content chosen based on a request initiated by a user of the web site.

A template which contains metadata about a piece of content may be used to assist in the assembly and caching of the piece of content to which it pertains. This template metadata may contain information on aspects of a request to which a particular piece of content may be sensitive, and whether a particular piece of content should be cached. The request itself may also contain metadata. This request metadata may pertain to the assembly of content which interests the user, and may consist of data pertaining to the individual aspects and parameters of the request.

Attention is now directed to systems and methods for caching content of a web site to be delivered to a user at a client computer. These systems and methods may be used to cache content to be delivered to an end user, increasing the performance of a the web site. Additionally, these systems and methods may be used to cache content based on certain parameters associated with a request for the content, allowing a similar request to produce the same content from the cache as opposed to dynamically evaluating each new request.

Furthermore, these systems and methods may allow the administrators of a web site to designate which parameters to use when caching content, and which parameters of each request to store when caching the content, by using a generalized architecture that allows evaluation of different caching parameters, including cookies, form data, session data, requests, and browser capabilities. The evaluation of these parameters may be modularized to allow the insertion and removal of modules designed to evaluate the impact of these individual parameters on the content to be delivered. One of these may be a module designed to evaluate the capabilities of a browser initiating the request for content, and contribute to the caching of content based upon these browser capabilities. Other modules may be custom designed by administrators of a web site and users of the architecture in order to tailor the caching of content to their specific needs.

Additionally, these systems and methods may allow metadata extracted from the incoming request and template metadata to be cached and associated with responsive content. This metadata, in turn, may allow a cache manager to dynamically update this content based upon conditions other than a request for similar content. This cache manager may be registered with an application manager which informs the cache manager when content has been updated, using the metadata stored with a piece of content a cache manager may regenerate a request, and update the cached content. Updating the cache may be done in the background, without receiving a new request from a user; this allows content in the cache to be kept current and may drastically improve the performance and response time of a web site. This application manager may be part of a content deployment agent coupled to a content management system. The deployment agent may receive updated content, and the application manager may take notice when content has been updated on the deployment agent. The application manager may also be responsible for the assembly of content to be delivered by an application server in response to a request from a user.

Before discussing further embodiments of the present invention, an exemplary hardware architecture for using embodiments of the present invention is described. In FIG. 1, a user on client computer 5, through an Internet browser, makes a request (using HTTP for example) to a web server 10 over the Internet 15. If the requested web page includes dynamic content, the web server 10 may initiate a script, using, for example, the common gateway interface ("CGI") mechanism, to send data to an application server 20 to generate the dynamic content. Application server 20 can generate dynamic HTML content according to a programming language such as Java, C or PERL and return the contents to web server 10. Web server 10 can, in turn, communicate the HTML content back to the client computer 5 as the requested web page.

In current systems, if the web server receives a request, it may check to see if content associated with the request is stored in cache 25, and if so, web server 10 can communicate this content back to the user on client computer 5, otherwise web server must pass on the request to application server 20 as described above. By caching content delivered from application server 20 in response to a request, this identical content may be delivered to client computer 5 more quickly in response to a request.

In most cases, these incoming requests contain a variety of template data and parameters associated with the request. For example, the request may contain a Universal Resource Locator (URL), originating locale, a query string, or perhaps a user-agent string indicating the type of browser initiating the request. An extensible caching framework may be present on web server 10 to evaluate incoming requests and locate cached content responsive to the incoming request based on the parameters contained in the request. This extensible caching framework may also formulate a signature to be utilized in retrieving this content from cache 25 when a request for the same content is received by web server 10. The extensible caching framework may also provide metadata to be stored with the content in order to facilitate regeneration of the request which originally resulted in delivery of the cached content. This metadata may be used by a cache manger to regenerate an original request in order to refresh the content residing in cache.

The computer or computers on which this extensible framework 120 may execute can include central processing unit ("CPU"), read-only memory ("ROM"), random access memory ("RAM"), hard drive ("HD") or storage memory, and input/output device(s) ("I/O"). I/O can include a keyboard, monitor, printer, electronic pointing device (e.g., mouse, trackball, etc.), or the like.

Portions of the systems and methods described herein may be implemented in suitable software code that may reside within ROM, RAM or HD. In addition to those types of memories, the instructions in an embodiment of the present invention may be contained on a data storage device with a different machine or computer readable storage medium, such as a hard disk. Alternatively, the instructions may be stored as software code elements on a DASD array, magnetic tape, floppy diskette, optical storage device, or other appropriate machine readable medium or storage device.

In an illustrative embodiment of the invention, the machine-executable instructions may be lines of compiled C++, Java, or other language code. Other architectures may be used. For example, the functions of any of the systems and methods may be performed by different computers than are shown in FIG. 1. Additionally, a computer program or its software components with such code may be embodied in more than one machine readable medium in more than one computer.

In the hardware configuration above, the various software components (e.g., extensible caching framework) may reside on any single computer or on any combination of separate computers. In alternative embodiments, some or all of the software components may reside on the same computer. For example, no web server 10 may be present in a web site and all content along with the extensible caching framework, cache manager and application manager may reside on application server 20.

Moving on to FIG. 2, an architectural diagram of an embodiment of an extensible caching framework is depicted. Extensible caching framework 200 may reside on web server 20 and use modules 202, 204, 206, 208 to evaluate parameters of an incoming request. Each of these modules 202, 204, 206, 208 may be responsible for a particular parameter associated with an incoming request. In many embodiments, the operators of a website can dictate specific parameters of an incoming request they wish to be evaluated by registering a custom module 208 with the framework. In this manner, the architecture 200 is made extensible by allowing the operators to add and remove modules 202, 204, 206, 208 relating to a wide variety of parameters of incoming requests.

When module 202, 204, 206, 208 is registered with the framework, the module 202, 204, 206, 208 may initialize and pass to the framework a set of configuration variables, these configuration variables may include interface method 210 to be used between the framework and module 202. More specifically, this may include variables of an incoming request to be passed by framework 200 to module 202, the template metadata of the content requested and desired by module 202, and the format in which information is to be returned by module 202 to framework 200. This registration data may also include registering configuration variables used by the module 202, and specific routines used by the module 202 for request mapping. During operation of framework 200, when web server 10 receives a request, modules 202, 204, 206, 208 executing on web server 10 may each evaluate portions of the incoming request with respect to the parameter to which the module 202, 204, 206, 208 pertains and pass their respective evaluations to framework 200. These evaluations may include metadata regarding a parameter, whether module 202, 204, 206, 208 believes the request should be served from cache 25 or passed along to application server 20, and a string value which may be used for locating responsive content in cache 25, for caching any content generated from application server 20 based on the request, or for assembling a signature to be associated with any content generated from application server 20.

Examples of caching parameters that may be evaluated by these modules include query string variables in the request, cookies in the request, the HTTP header in the request, form variables in the HTTP POST request, locale detected from the request, or a custom defined parameter. It will be readily apparent to those of ordinary skill in the art that a wide variety of parameters may be identified in requests and utilized in the caching of various pieces of content. Additionally, it will be apparent that because of the variety of these parameters the implementation of each module 202, 204, 206, 208 may vary greatly, and that the important concept is that modules may be added and removed from framework 200, and framework 200 will continue to utilize a set of available modules 202, 204, 206, 208 in the evaluation of incoming requests and the caching of the corresponding generated content.

The evaluation of these individual parameters allows content delivered in response to a request to be tailored more accurately to the minute specifics of an incoming request. For example, in some cases there may be many versions of a particular piece of content, one that employs Java, one that employs frames, and one that employs Active X. If content employing Java is delivered to a browser which utilizes Active X the content may be incorrectly displayed.

Hence, in many embodiments extensible caching framework 200 includes module 206 for evaluating the capabilities of the browser initiating the incoming request (BCAPS module 206). Browser capabilities (BCAPS) are a set of features (e.g., Frames, Tables) supported by various browsers. The user-agent header in an HTTP request governs the capabilities that the requesting browser supports. There are thousands of variations of user agent headers (a user-agent test file may contain 50,000 user agents).

To implement the BCAPS module 206, a process may map the user-agent string contained in an incoming HTTP request to a set of browser capabilities using an XML file. This XML file defines a list of rules that maps regular expressions to browser features. This XML file may be easily modified to add a new browser version or browser feature. For maximum flexibility, administrators of a web site may be allowed to add additional rules for the BCAPS mapping in the XML file or to specify these rules in a separate XML file that follows a designated syntax. This separate XML file suits the need for web site administrators who want to support some non-mainstream browser features or browser versions. One advantage of a separate XML file is that the separate XML file may not be purged during an upgrade process. The BCAPS module may be written in C++ or Java and be based on the XML files.

A BCAPS module may utilize the following APIs, which may be included in templates, to evaluate the capabilities of the browser initiating a request as various capabilities pertain to a particular piece of content:

public Boolean supportBrowserFeature(String aBrowserFeature);

It returns 'true' if the given browser feature is supported by the requesting browser, and 'false' otherwise.

If called from a cacheable template, this API checks the customized (browser) http header (inserted by the web server plugin). If called from a dynamic template, the API causes a dynamic computation of the list of browser features supported by the requesting browser.

public Boolean supportBrowserFeatures(String[ ]browserFeatureArray);

It returns 'true' if all browser features in the given array are supported by the requesting browser, and 'false' otherwise. This API may also check the customized (browser) http header (which may be inserted by the web server) or may dynamically compute the list of browser features supported by the requesting browser.

public String[ ] getBrowserFeatures( );

returns an array of browser features supported by the requesting browser.

Additionally, BCAPS module 206 may return the user-agent string to caching framework 200 to be stored and associated with responsive content in cache 25. The user-agent string may be stored along with request metadata and included in future regeneration requests.

The following scenario may illustrate the use of the BCAPS module in caching framework.

1. A request for a particular piece of content is received by the extensible caching framework, 2. The template associated with the request is located.

3. A metadata repository may be consulted to check whether or not this template is sensitive to browser features (by retrieving the value of template level metadata BROWSER_FEATURES). If this template is not sensitive to browser features, no further process regarding bcaps is needed.

4. If the content is sensitive the BCAPS module may be used to get the full set of browser features supported by the requesting browser.

5. Using these browser features, the request may be mapped to a physical file.

a. If the physical file exists, the module may modify the request url to point to the physical file and return.

b. If that physical file does not exist, the module may add customized (browser features) http header in the request and return. The value of this header may be a list of features in the set of common features.

The browser capability can be implemented through the framework for generic application definable cache sensitive parameters. An example of a file which may be used by a BCAPS module to implement the functionality described is depicted in Example 1.

FIG. 3 depicts an embodiment of the method for utilization of the extensible caching framework and its corresponding modules during the operation of a web site. As illustrated specifically with regards to the BCAPS module above, this method may include registering a template pertaining to a piece of content (block 302), receiving a request (block 304), associating the request with a template (block 306), identifying parameters associated with the template (block 308), evaluating these parameters using modules corresponding to the parameters (block 310), and checking to see if responsive content is located in the cache (block 312). If responsive content is not located in the cache the method may further comprise generating responsive content (block 316) and caching this responsive content along with associated metadata (block 318). In both cases, responsive content may be returned to the requester (block 320).

After a request is received by web server 10 (block 304) this request may be associated with a template (block 306) by extensible caching framework 200 residing on web server 10. A request issued from client computer 5 usually contains a URL which may refer to a specific piece of content residing on application server 20, along with associated data pertaining to how a user on client computer 5 would like the requested content assembled. Consequently, extensible caching framework 200 can identify a particular piece of content that is to be assembled in accordance with this request by comparing the URL of an incoming request with templates registered by various pieces of content provided by application server 20. Framework 200 may then associate the template corresponding to the requested content with the incoming request (block 306).

This template, in turn, may contain a list of parameters which are helpful in tailoring the assembly of this content to the incoming request. The metadata associated with the template corresponding to the requested content may allow identification of parameters to which a particular piece of content is sensitive (block 308). These parameters may include form data, header data, session, request, page-context, browser-features and other such data which will be obvious to those of ordinary skill in the art. Extensible caching framework 200 may parse information relating to the parameters indicated by the template out of the incoming request and pass this information, along with associated.

Note that not all of the activities described in the process flow diagram are required, that an element within a specific activity may not be required, and that further activities may be performed in addition to those illustrated. Additionally, the order in which each of the activities are listed is not necessarily the order in which they are performed. After reading this specification, a person of ordinary skill in the art will be capable of determining which activities and orderings best suit any particular objective.

When a request comes in from client computer 5 this request usually contains a URL which references a particular piece of content which resides on application server. This piece of content may be assembled from various constituent subparts and returned to client computer 5 based upon specifics contained in the request. Consequently, a template may be formed from a piece of content which contains metadata regarding certain aspects of a request which may pertain to assembling the specifics and subparts of a particular piece of content, as discussed above. Whenever a new piece of content, or a new application server such as a JSP (Java Service Provider), becomes part of a web site, a template containing metadata pertinent to that piece of content or application server may be registered with the extensible caching framework (block 302). An example of a definition file pertaining to a cacheable parameter template and how the registration of such a template may occur is depicted in Example 2. template metadata, to modules 202, 204, 206, 208 which correspond with these parameters. In many cases, framework 200 will pass only information regarding the specific parameter corresponding to module 202, 204, 206, 208.

In turn, each module 202, 204, 206, 208 may evaluate the particular parameter to which it pertains (block 310). Modules 202, 204, 206, 208 invoked for this evaluation process may return several pieces of data to caching framework 200. These may include a status which indicates whether framework 200 should map the incoming request to a cache file or let the request go through to application server 20 for dynamic evaluation. If any individual module 202, 204, 206, 208 indicates that the request should not be served from cache 25, for example if a module sees a certain cookie, framework 200 may let the request be subject to dynamic evaluation. Another piece of data which may be returned by an individual module 202, 204, 206, 208 may be a string pertaining to the parameter for which the module is responsible. For example, a query string module may return the value "city=Austin&state=TX", while the browser capabilities module may return the value "IE6 JavaScript Frames" in the case where the browser initiating the request is Internet Explorer Version 6. Other data which may be returned by a module may be request metadata which to be stored with cached content in order to facilitate regeneration of the request which resulted in an associated piece of cached content.

If all modules 202, 204, 206, 208 request that content be served from cache if possible, framework 200 may generate a string, or signature, to be used for the cache file name by accumulating or concatenating strings returned from each individual module 202, 204, 206, 208 and hashing them. This cache file name can then be compared to the hash table of cache 25 to determine if applicable content is resident in cache 25, as is commonly known in the art (block 312). If applicable content is present in cache 25 it may be returned to the user on client computer 5 obviating the need to evaluate the request at application server (block 320). However, if applicable content is not present in cache 25, framework 200 may pass the incoming request onto application server 20 for dynamic evaluation and content generation (block 316). It will be obvious to those of ordinary skill in the art that these methods may be used for other storage mediums which may be used to store content, such as databases etc.

Once the request has been evaluated and responsive content generated (block 316), content responsive to the incoming request may be returned to the user on client computer 5 (block 316). In many cases, an application manager may be responsible for assembling or deploying the requested content, while application server 20 may be responsible for delivering the assembled responsive content to the user.

Additionally, content delivered by application server 20 may be stored in cache 5 using the cache file name generated by framework 200 (block 318). In this manner, if a request is received for similar content, framework 200 will generate an identical cache file name, and content may be served from cache 25 obviating the need to pass the identical request to application server 20 yet again.

Furthermore, when content delivered by application server 20 is stored in cache 25 it may be stored with metadata corresponding to this content in order to allow cache 25 to be more efficiently managed. This metadata may include metadata pertaining to the template which corresponds to the content, and metadata which pertains to the request which resulted in the content. This metadata may be returned by modules 202, 204, 206, 208 to framework 200 during evaluation of the parameters of an incoming request and may allow content in cache 25 to be automatically updated without receiving an identical request for the content. It will be recognized by those of ordinary skill in the art that other types of data may be stored in cache 25 which will allow the automatic update of content in cache 25.

These systems and methods for automatic cache management may have a timer associated with a piece of cached content. When this timer expires the request that originally resulted in the content associated with the timer can be regenerated from the metadata stored with the content. This regenerated request may be passed on to application server 20, content responsive to the request generated, and this newly generated content may replace the content previously stored in cache 25. Other occurrences may also trigger updates of cache 25. For example, an application manager residing on application server 20 may inform a cache manager when content on application server 20 has been updated. The cache manager may then update cache 25 as described previously.

Figure 4:
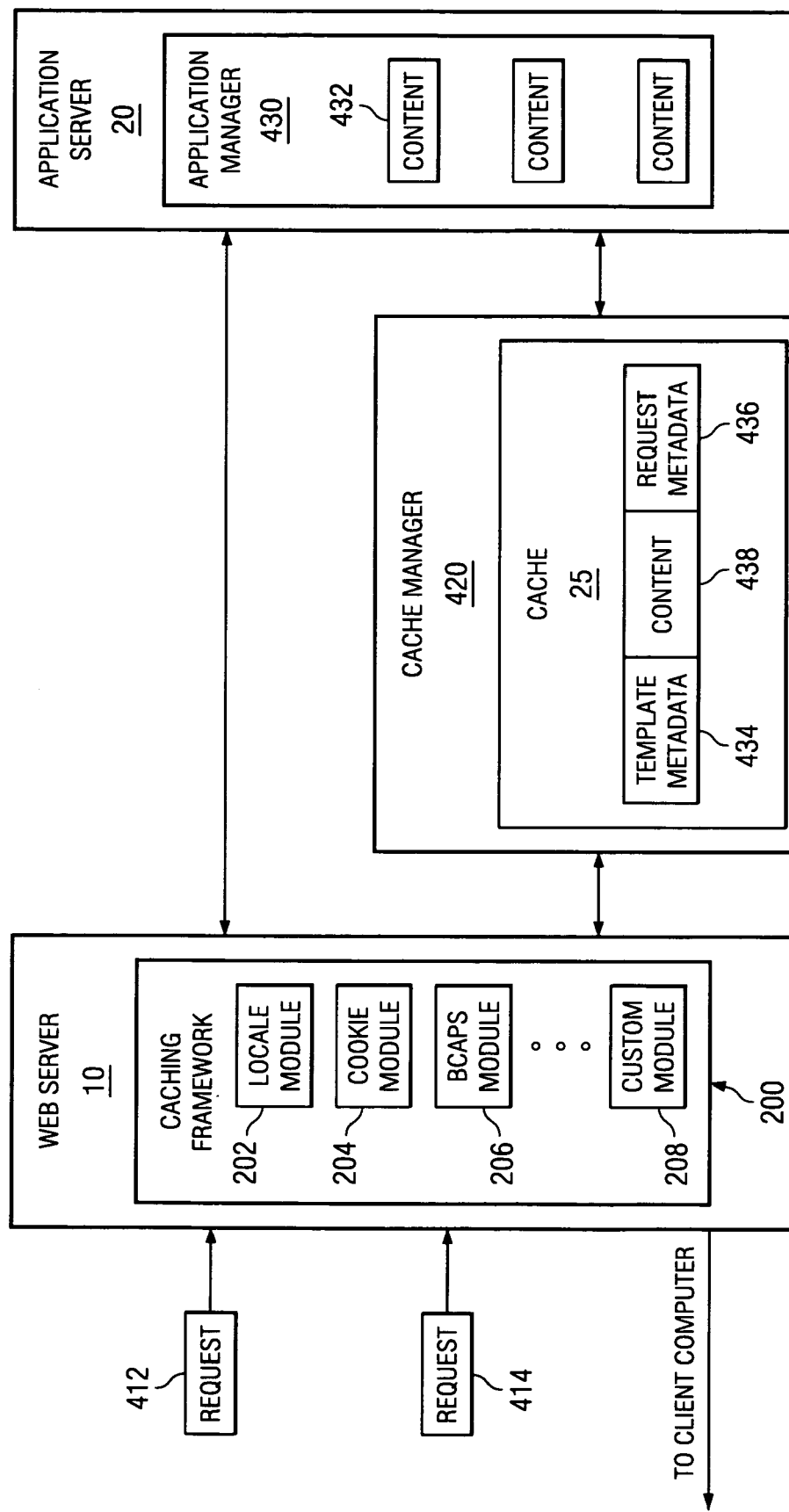
FIG. 4 is a block diagram depicting an embodiment of a system for automatic cache management.

FIG. 4 depicts the automatic update of cache 25 using cache manager 420 and application manager 430. Cache manager 420 may be responsible for managing one particular physical cache 25 or a logical cache, and may automate the functionality of cached file placement, expiration and request regeneration. When an incoming request 412 is received by web server 10 request 412 is evaluated by caching framework 200 and its associated modules 202, 204, 206, 208 as described above. If the requested content is not contained in cache 25 the request 412 is passed on to application server 20, where responsive content 432 will be generated, stored in cache 25, and delivered in response to the request.

When content 432 is stored in cache 25, cached content 438 may be stored and associated with metadata 434 pertaining to the template corresponding to content 432, or metadata 436 corresponding to the original request 412. The template metadata 434 may be gleaned from the incoming request's URL and templates registered with caching framework 200 as described above. The metadata 436 pertaining to a particular request may be instance or request metadata, returned by each module 202, 204, 206, 208 invoked by caching framework 200 during evaluation of an incoming request 412 as described above. Request or instance metadata may be a list or a hash table returned by a module 202, 204, 206, 208. For example, a browser capabilities module may return a list equal to "IE6, Frames" or a hash table consisting of <user-agent, "Mozilla/5.0001 (windows; U; NT4.0, en-us) Gecko/25250101">, a query string module may return a hash table consisting of <city, Austin>, <state Texas>. These lists and hash tables may be stored in cache 25 and associated with cached content 438 responsive to original request 412. This metadata 434, 436 may be passed by caching framework 200 to cache manager 420 for storage with content 432 generated in response to request 412. Additionally, a content tracking system may be utilized by cache manager 420. This content tracking system may store the dependencies of cached content to allow the identification of which pieces of content in cache are dependent or based upon other pieces of content.

At some point, content 432 on application server may be altered. This may occur because the composition of content 432 has been altered by providers of the web site, or because sub-components and resources used to assemble content 432 have been changed. These changes in content 432 render content 438 present in cache 25 invalid, as is commonly known in the art. Cache 25 must be updated with current content 432 resident on application server 20 in order that the most up to date information may be served from cache 25 in response to another similar request 414; otherwise content 438 resident in cache 25 will be marked as stale and request 414 will be passed to application server 20. Embodiments of the present invention allow content 438 in cache 25 to be updated with current content 432 without receiving a new request 414 for this content. This may be accomplished by replacing previously stored content 438 with new content generated by application manager 20 in response to a request regenerated in response to updated content.

Cache manager 420 may be informed that content 432 on application server 20 has been altered or updated. In one particular embodiment this is done through template metadata. As described above, a template can be created from a piece of content which describes the composition and dependencies of this content. When one of the dependencies, applications, or pieces of content on application server 20 changes or is added it may register with application manager 430. In turn, application manager 430 may discern which templates will be affected by these changes. Alternatively, application manager may discern which parameters of a request would result in this changed content. For example, content meant for an Internet Explorer web browser version 6 which supports frames may have changed, consequently application manager may determine that all content responsive to browser capabilities equal "IE6, Frames" may be identified.

Application manager 430 may propagate these application and content changes to cache manager 420 by communicating a variety of things to the cache manager 420. These communications may include the affected templates or request parameters, template changes, template metadata changes, or content changes themselves. Communication between application manager 430 and cache manager 420 may be accomplished through the use of Java Messaging Service (JMS), Hyper Text Transfer Protocol (HTTP), or extensible Markup Language (XML). Once these changes are communicated to cache manager 420, cache manager 420 may identify content 438 located within cache 25 which is affected by changes to content 432. Cache manager 420 may identify cached content 438 sensitive to changes in content 432 by comparing the template metadata communicated by application manager 430 to template metadata 434 stored in cache 25. For example, application manager may communicate to cache manager that all content constructed from template "foo.jsp" has been affected by a change in content 432. Cache manager compare the name "foo.jsp" to all names contained in template metadata. When cache manager locates stored content 438 where the associated template metadata 434 has name="foo.jsp", cache manager 420 has identified an invalid piece of stored content 438. Cache manager 420 may also identify cached content 438 sensitive to changes by comparing request metadata communicated by application manager 430 with request metadata 436 associated with stored content. For example, application manager 430 may communicate to cache manager 420 that any content sensitive to BCAPS="IE6, Frames" has been updated. Upon identifying request metadata 436 containing BCAPS="IE6, Frames", cache manager 420 knows cached content 438 associated with this request metadata 436 is invalid. Additionally, cache manager may employ a content tracking system to identify which pieces of content resident in cache 25 are dependent on an altered piece of content. This content tracking system may store content dependencies for content in cache 25, as explained above. When cache manager 420 receives a notice from application manager 430 that content 432 has changed, cached content 438 sensitive to this change may be identified by checking dependencies present in the content tracking system.

Once cache manager 420 has identified content 438 that is invalid because of changes on application server 20, cache manager 420 may update cached content 438 in cache 25. This may be done by regenerating the request that resulted in content 438 being placed in cache 25. Using request metadata and template metadata associated with cached content 438 in cache 25, cache manager 420 can regenerate the request which caused application server 20 to generate cached content 438. Cache manager 420 may regenerate this request and pass it to application manager 20. Application manager 20, in turn, may generate content 432 responsive to this request and return this content 432 to cache manager 420. Cache manager can then replace invalid content 438 with content responsive to the regenerated request. In this manner, content 438 resident on cache may be kept coherent with content 432 on application manager 20 without receiving similar request 414 from client computer 5.

Cache manager 420 may also update cache 25 of its own volition, without notification from application manager 430. In one embodiment, cache manager 420 stores a timer associated with each piece of content 438 stored in cache 25. When this timer has expired cache manager 420 may update content 438 in cache 25 using associated request and template metadata as described above. Cache manager 420 may also update all content stored in cache 25 in response to an update cache command from application manager 430 or caching framework 200. Using these various cache management techniques, and other methodologies obvious to those of ordinary skill in the art, coupled with the ability to regenerate requests associated with stored content 438, content 438 can be kept up to date in cache 25 without receiving an incoming request from client computer 5. Consequently, the next time similar request 414 is received, content responsive to this request 438 may be served from cache 25 as opposed to application server 20 generating responsive content 432. Serving responsive content 438 from cache 25 allows a web site to more quickly respond to an incoming request 412, 414 and reduces the strain on application server 20. An example of how a cache manager may regenerate a request associated with stored content is depicted in Example 3.

This capability for automatic cache management also facilitates the implementation of a wide variety of caching policies. An instance deleter may be implemented as a background thread that wakes up at a certain interval and deletes entries in cache 25 which have been invalid for more than a certain time period. Similarly, an instance regenerator may be implemented which updates entries in cache 25 which have been invalid for more than a certain period. It will be obvious to those of ordinary skill in the art the myriad number of cache management policies which may be implemented using the systems and methods described above, for example, a cache may be updated every time content is altered, or, if content changes too rapidly a cache entry where the content on application server 20 has been altered may be updated at a periodic interval. An expire timer may also be attached to each cache 25 entry, when this period expires that cache 25 entry may be updated.

EXAMPLES

Specific embodiments of the invention will now be further described by the following, nonlimiting examples which will serve to illustrate in some detail various features. The following examples are included to facilitate an understanding of ways in which the invention may be practiced. It should be appreciated that the examples which follow represent embodiments discovered to function well in the practice of the invention, and thus can be considered to constitute preferred modes for the practice of the invention. However, it should be appreciated that many changes can be made in the exemplary embodiments which are disclosed while still obtaining like or similar result without departing from the spirit and scope of the invention. Accordingly, the examples should not be construed as limiting the scope of the invention.

Example 1

An example of an XML file which may be utilized in conjunction with BCAPS module 206.

```xml
<?xml version="1.0" encoding="ISO-8859-1" standalone="yes"?>
<!--
    This is vignette V6 bcaps processing rule described in XML.
    The root element is <Bcaps_map> that contains one or more
    <RuleGroup> elements, which in turn contains one or more
    <Rule> elements.

Each Rule defines a Pattern (regular expression) and
    corresponding Features (browser features), i.e., a browser
    supports these features if its user agent string matches
    the Pattern.

Each RuleGroup can have one or more Rules. Inside one RuleGroup,
    only the first matched Rule can be applied, i.e., if a browser's
    user agent string matches Patterns in multiple Rules inside one
    RuleGroup, only the Features in the first of such Rules is used
    to construct the list of browser features supported by this
    browser. This implied that the order of Rules inside one
    RuleGroup is important.

All browser features obtained from RuleGroups are aggregated.
-->

<!--DTD-->
<!DOCTYPE Bcaps_map [
<!ELEMENT Bcaps_map    (RuleGroup+) >
<!ELEMENT RuleGroup    (Rule+) >
<!ELEMENT Rule         (Pattern, Features, Notes?) >
<!ELEMENT Pattern      (#PCDATA) >
<!ELEMENT Features     (#PCDATA) >
<!ELEMENT Notes        (#PCDATA) >
]>
```

```
<Bcaps_map>
<!-- Operating Systems-->
    <RuleGroup>
        <Rule>
            <Pattern>*Win*95</Pattern>
            <Features>WIN,WIN95</Features>
            <Notes>Windows 95</Notes>
        </Rule>
        <Rule>
            <Pattern>*Win*98</Pattern>
            <Features>WIN,WIN98</Features>
            <Notes>Windows 98</Notes>
        </Rule>
        <Rule>
            <Pattern>*Win*NT</Pattern>
            <Features>WIN,WINNT</Features>
            <Notes>Windows NT</Notes>
        </Rule>
        <Rule>
            <Pattern>*Win*3.1</Pattern>
            <Features>WIN,WIN3.1</Features>
            <Notes>Windows 3.1</Notes>
        </Rule>
        <Rule>
            <Pattern>*Win*</Pattern>
            <Features>WIN</Features>
            <Notes>Generic windows</Notes>
        </Rule>
        <Rule>
            <Pattern>*Mac*</Pattern>
            <Features>MAC</Features>
            <Notes>Macintosh</Notes>
        </Rule>
        <Rule>
            <Pattern>*WebTV*</Pattern>
```

Example 2

Example of how caching parameters corresponding to a template may be described, how this template may be registered and a template metadata message handled, the following XML code depicts one example of how caching parameters corresponding to a template may be described:

```xml
<?xml version="1.0" encoding="UTF-8"?>
<xsd;schema targetNamespace="http://www.vignette.com/cod/am"
xmlns="http://www.vignette.com/cod/am"
xmlns:xsd="http://www.w3.org/2001/XMLSchema">
    <!-- definition of attributes -->
    <xsd:attribute name="version" type="xsd:string"/>
    <xsd:attribute name="group" type="xsd:string"/>
    <xsd:attribute name="path" type="xsd:string"/>
    <xsd:attribute name="name" type="xsd:string"/>
    <xsd:attribute name="inherit">
        <xsd:simpleType>
            <xsd:restriction base="xsd:string">
                <xsd:enumeration value="add"/>
                <xsd:enumeration value="replace"/>
                <xsd:enumeration value="remove"/>
            </xsd:restriction>
        </xsd:simpleType>
    </xsd:attribute>
    <xsd:attribute name="use">
        <xsd:simpleType>
            <xsd:restriction base="xsd:string">
                <xsd:enumeration value="sensitive "/>
                <xsd:enumeration value="dependent"/>
                <xsd:enumeration value="no-cache"/>
            </xsd:restriction>
        </xsd:simpleType>
    </xsd:attribute>
<!-- definition of complex type elements -->
<xsd:element name="param">
    <xsd:complexType>
        <xsd:attribute ref="use"/>
        <xsd:attribute ref="name"/>
    </xsd:complexType>
</xsd:element>
<xsd:complexType name="cacheFeatureType">
    <xsd:sequence>
        <xsd:element ref="param" minOccurs=
        "0" maxOccurs="unbounded"/>
    </xsd:sequence>
    <xsd:attribute ref="inherit" use="optional"/>
</xsd:complexType>
<xsd:complexType name="customCacheFeatureType">
    <xsd:sequence>
        <xsd:element ref="param" minOccurs=
        "0" maxOccurs="unbounded"/>
    </xsd:sequence>
    <xsd:attribute ref="name" use="required"/>
    <xsd:attribute ref="inherit" use="optional"/>
</xsd:complexType>
<xsd:element name="query-string" type="cacheFeatureType"/>
<xsd:element name="cookie" type="cacheFeatureType"/>
<xsd:element name="header" type="cacheFeatureType"/>
<xsd:element name="form-data" type="cacheFeatureType"/>
<xsd:element name="locale" type="cacheFeatureType"/>
<xsd:element name="browser-feature" type="cacheFeatureType"/>
<xsd:element name="request" type="cacheFeatureType"/>
<xsd:element name="page-context" type="cacheFeatureType"/>
<xsd:element name="servlet-context" type="cacheFeatureType"/>
<xsd:element name="session" type="cacheFeatureType"/>
<xsd:element name="custom" type="customCacheFeatureType"/>
<xsd:group name="cacheFeaturesList">
    <xsd: all>
        <xsd:element ref="query-string" minOccurs="0"/>
        <xsd:element ref="cookie" minOccurs="0"/>
        <xsd:element ref="form-data" minOccurs="0"/>
        <xsd:element ref="header" minOccurs="0"/>
        <xsd:element ref="request' minOccurs="0"/>
        <xsd:element ref="page-context" minOccurs="0"/>
        <xsd:element ref="servlet-context" minOccurs="0"/>
        <xsd:element ref="session" minOccurs="0"/>
        <xsd:element ref="locale" minOccurs="0"/>
        <xsd:element ref="browser-feature" minOccurs="0"/>
        <xsd:element ref="custom" minOccurs="0"/>
    </xsd:all>
</xsd:group>
<xsd:element name="group">
    <xsd:complexType>
        <xsd:group ref="cacheFeaturesList"/>
        <xsd:attribute ref="name" use="required"/>
    </xsd:complexType>
</xsd:element>
<xsd:element name="include">
    <xsd:complexType>
        <xsd:attribute ref="group" use="required"/>
    </xsd:complexType>
</xsd:element>
<xsd:element name="web-resource">
    <xsd:complexType>
        <xsd:sequence>
            <xsd:element ref="include" minOccurs=
            "0" maxOccurs="unbounded"/>
            <xsd:group ref="cacheFeaturesList"/>
        </xsd:sequence>
        <xsd:attribute ref="path" use="required"/>
    </xsd:complexType>
</xsd:element>
<xsd:element name="cdf">
    <xsd:complexType>
        <xsd:sequence>
            <xsd:element ref="group" minOccurs=
            "0" maxOccurs="unbounded"/>
            <xsd:element ref="web-resource" minOccurs="0"
maxOccurs="unbounded"/>
        </xsd:sequence>
        <xsd:attribute ref="version" use="required"/>
    </xsd:complexType>
</xsd:element>
</xsd:schema>
```

This portion of pseudocode may handle template registration and template metadata messaging:

```
processMetadataMsg (httpBody : InputStream, contentLength : int)
    // Read the msg, then unmarshal it into a castor msg object
    byte [ ] buffer = new byte [contentLength]
    int bytesRead = httpBody.read (buffer)
    String string = new String (buffer, "UTF-8 ")
    StringReader stringReader = new StringReader(string)
    metadataMsg = MetadataMsg.unmarshalMetadataMsg (stringReader)
    String stageId = metadataMsg.getStageId
    String cds Id = metadataMsg.getCdsId
    String siteId = metadataMsg.getSiteId
    for each templateEntry in metadataMsg.getTemplateEntry,
        if templateEntry.getTemplateEvent == add,
            addTemplate (stageId, cdsId, siteId, metadataMsg.getDaId,
templateEntry)
        else if templateEntry.getTemplateEvent == delete,
            deleteTemplate (stageId, cdsId, siteId, templateEntry)
        else if templateEntry.getTemplateEvent == update-metadata,
            updateTemplateMetadata(stageId, cdsId, siteId, templateEntry)
        else if templateEntry.getTemplateEvent == update-template,
            updateTemplate(stageId, cdsId, siteId, templateEntry)
        else if templateEntry.getTemplateEvent == update-both,
            updateBoth(stageId, cdsId, siteId, templateEntry)
addTemplate (stageId : String, cdsId : String, siteId : String, daId :
String,
        tEntry : TemplateEntry)
    // Begin transaction
    mdCon.setAutocommit(false)
    // Ignore the metadata-msg if it's redundant
    if mdCon.templateExists (stageId, cdsId, siteId, tEntry.getPathAtPg),
return
```

```
insert Template metadata row tMd (and rows in associated tables like
      ModuleParameter and TemplateState) given the values in tEntry
  delete WebServerLookup rows with template's
      stageId, cdsId, siteId, and
pathAtPg
  // End transaction
  mdCon.commit
  mdCon.setAutocommit(true)
  PeriodicExpiration.templateAdd(tMd)
deleteTemplate (stageId : String, cdsId : String, siteId : String,
      tEntry : TemplateEntry)
  // Begin transaction
  mdCcn.setAutocommit (false)
  String pathAtPg = tEntry.getPathAtPg
  tMd = mdCon.getTemplateMetadata (stageId, cdsId, siceId, patkqtPg)
  // Ignore the metadata-msg.if it's redundant
  if tMd == null, return
  if tMd.getObjectId ! = tEntry.getTemplateMetadata.getObjectId, return
  invalidateAllInstances(tMd)
  mdCon.deleteTemplate(tMd)
  delete WebServerLookup rows with template's
      stageId, cdsId, siteId, and
pathAtPg
  // End transaction
  mdCon.comit
  mdCon.setAutocommit(true)
  PeriodicExpiration.templateDelete(tMd)
invalidateAllInstances(tMd : TemplateMetadata)
  instances = mdCon.findInstances (tMd)
  for each iMd in instances,
    iMd.setInstanceState (Invalid)
    iMd.setExpirationTimestamp (new Date)
invalidateEachInstance (instances : List)
  for each iMd in instances,
    mdCon.setTemplateInstanceState (iMd, Invalid)
updateTemplateMetadata (stageId : String, cdsId : String, siteId : String,
      tEntry : TemplateEntry)
  tMd = mdCon.getTemplateMetadata (stageId, cdsId, siteId,
tEntry.getPathAtPg)
  // Ignore the metadata-msg if it's redundant
  if tMd == null, return
  if tMd.getObjectId ! = tEntry.getTemplateMetadata.getObjectId, return
  if tMd.getModCount >= tEntry.getTemplateMetadata.
      getModCount, return
  if tMd.getMetadataHash == tEntry.getTemplateMetadata.
      getMetadataHash, return
  doMetadataChange (tEntry, tMd)
// Called when a metadata-msg indicates module metadata changed.
// Compares module parameters from template metadata
to those in metadata-msq and
// invalidates instances according to the following rules:
//
//      if any parameters were added,
//         → invalidate (no regen) all instances
//      if any sensitive or dependent parameters were removed,
//         → invalidate (no regen) instances with ModuleValues for those
parameters
//      if any no-cache parameters were removed,
//         → just update metadata
// Note. here's an optimization that could be made to the case where
sensitive or
// dependent parameters are removed. Instead of deleting
an instance X that uses a
// removed parameter P, Y_paramHash = X_
paramHash - P. If Y_paramash is not in
// the instance metadata, add it and rename X's cache file from
X_paramHash_v.ext
// to Y_paramHash.ext.
doMetadataChange (tEntry : TemplateEntry, tMd : TemplateMetadata)
  // Begin transaction
  mdCon.setAutocommit (false)
  // Invalidate all instances if any parameters were added.
  paramAdded = false
  for each nParam in tEntry.getTemplateMetadata.getModuleParams,
      found = false
      for each oParam in tMd.getModuleParameters,
          if nParam.getName == oParam.getName
              && nParam.getOptions == oParam.getOptions,
              found = true
              break
      if ! found,
          paramAdded = true
          break
  if ! paramAdded,
      // Invalidate instances that use any sensitive or dependent parameters
that
      // were removed.
      for each oParam in tMd.getModuleParameters,
          found = false
          for each n?aram in tEntry.getTemplateMetadata.getModuleParams,
              if nParam.getName == oParam.getName
                  && nParam.getOptions == oParam.getOptions,
                  found = true
                  break
          if ! found && oParam.getType ! = no-cache,
              removedParamList.add(oParam)
      if ! removedParamList.isEmpty,
          instances = mdCon.getInstancesUsingParams
              (tMd, removedParamList)
  update Template metadata row (and rows in associated tables like
ModuleParameter
      and TemplateState) given the values in tEntry
  // End transaction
  mdCon.commit
  mdCon.setAutocommit(true)
  if invalidateAll,
      invalidateAllinstances (tMd)
  else if ! instances.isEmpty,
      invalidateEachInstance (instances)
  PeriodicExpiration.templateMetadataUpdate (tMd)
updateTemplate (stageId : String, cdsId : String, siteId : String,
      tEntry : TemplateEntry)
  tMd = mdCon.getTemplateMetadata (stageId, cdsId, siteId, pathAtPg)
  // Ignore the metadata-msg if it's redundant
  if tMd == null, return
  if tMd.getObjectId ! = tEntry.getTemplateMetadata.getObjectId, return
  if tMd.getModCount >= mdMsg.getModCount, return
  if tMd.getTemplateHash == tHash, return
  doTemplatechange (tEntry, tMd)
doTemplateChange (tEntry : TemplateEntry, tMd : TemplateMetadata)
  String pathAtPg = tEntry.getPathAtPg
  // Begin transaction
  mdCon.setAutocommit (false)
  tHash = tEntry.getTemplateMetadata.getTemplateHash
  tMd.setTemplateHash (tHash)
  tState = tMd.getTemplateState (tEntry.getDaId)
  if tState == null,
      tState = new TemplateState
      tState.setDeploymentAgentId (tEntry.getDaId)
      templateStates = tMd.getTemplateStates
      templateStates.add (tState)
  tState.setTemplateHash (tHash)
  tMd.setObjectId (tEntry.getTemplateMetadata.getObjectId)
  tMd.setModCount (tEntry.getTemplateMetadata.getModCount)
  tMd.update
  //   Get this template's valid instances. Skip reqen instances, since
they've
  //   already been been cleared by some other event. If PG's already
doing the
  //   regen, the placement templateHash will control whether it's placed
or regen'd
  //   again.
  instances = mdCon.getAllInstances (tMd)
  // End transaction
  mdCon.commit
  mdCon.setAutocommit (true)
  cm.invalidateOrRegenEachInstance (tMd, instances)
updateBoth (stageId : String, cdsId : String, siteId : String,
      tEntry : TemplateEntry)
  tMd = mdCon.getTemplateMetadata (stageId, cdsId, siteId,
tEntry.getPathAtPg)
  //   Ignore the metadata-msg if it's redundant
  if tMd == null, return
  if tMd.getobjectId ! = tEntry.getTemplateMetadata.getObjectId, return
```

```
    if tMd.getModCount >= mdMsg.getModCount, return
    if tMd.getMetadataHash ! = tEntry.getTemplateMetadata.
       getMetadataHash,
return
       doMetadataChange (tEntry, tMd)
    if tMd.getTemplateHash ! = tEntry.getTemplateMetadata.
       getTemplateHash,
return
       doTemplatechange (tEntry, tMd)
```

Example 3

The following is an example of how a cache manager may invoke a procedure to regenerate a request.

```
regenerate (tMd : TemplateMetadata, instanceId : int)
   iMd = mdCon.getInstance (instanceId)
   regenerate (tMd, iMd)
regenerate (iMd : InstanceMetadata)
   tMd = mdCon.findTemplate (iMd.getTemplateKey)
   regenerate (tMd, iMd)
regenerate(tMd : TemplateMetadata, iMd : InstanceMetadata)
   puts a RegenerateMsg in the regenerator queue with timeout =
      iMd.expirationTimestamp + REGENERATE_
      MAX_TIME_TO_REQUEST
RegenerateMsg
   tMd : TemplateMetadata
   iMd : InstanceMetadata
The following method handles the RegenerateMsg:
handleRegenerateMsg (regenMsg : RegenerateMsg)
   tMd = regenMsg.tMd
   iMd = regenMsg.iMd
   // Let modules add their parameters to the request
   request = new VgnHttpServletRequest
   for each moduleValues in iMd.enumerateModuleValues,
      module = cm.modules.get (moduleValues.getModuleName)
      if ! module.isRegenSupported,
         return
      if ! module.fillRegenRequest (request, moduleValues)
         return
   // Set host & port
   if regenHost.length == 0,
      get host & port from iMd.getRegenHost
   else
      host = regenHost
      port = regenPost
      get host & port from iMd.getRegenHost
   else
      host = regenHost
      port = regenPort
   request.setServerName (host)
   request.setServerPort (port)
   //    Set URI to outerUrlAtWs if there's a WS tier,
   or pathAtPg otherwise
   If iMd.hasOuterUrlAtWebserver,
      request. setURI (iMd.getouterUrlAtwebserver)
      if iMd.isComponent,
         request.addHeader ("x-vgn-component-path-at-pg",
            tMd.getPathAtPg)
         request.addHeader ("x-vgn-stage-id", tMd.getStageId)
         request.addHeader ("x-vgn-cds-id", tMd.getCdsId)
         request.addHeader ("x-vgn-site-id", tMd.getSiteId)
      else
         request.setURI (tMd.getPathAtPg)
   if iMd.isComponent,
      //    Add response-content-type header. The filter sets the Content-
type of
      //    the response before invoking the component so the PG can
transcode the
      //    component output to match the encoding of the template that
called the
      //    component.
      request.addHeader ("x-vgn-response-content-type",
         iMd.getResponseContentType)
      // Add Content-type header if a module didn't already do it.
      if request.getContentType == null &&
         iMd.getRequestContentType ! = null,
            request.setContentType (iMd.getRequestContentType)
      //    Add is-regen header. This header tells the plug-in to not serve the
request
      //    from the cache. The header is forwarded in the request to the PG.
PG sees
      //    it and knows to not serve the request from the cache.
      request.addHeader ("x-vgn-is-regen" , "true" )
      //    Add identifiers of different events that can cause regenerations.
This helps
      //    PG avoid redundant regenerations.
      request.addHeader ("x-vgn-template-hash", tMd.getTemplateHash)
      request.addHeader ("x-vgn-clear-cache-id", tMd.getClearCacheId)
      request.addHeader ("x-vgn-periodic-expiration-timestamp",
         tMd.getPeriodicExpirationTimestamp)
      rcdState = mdCon.findRecordState (tMd.getStageId, tMd.getCdsId)
      request.addHeader ("x-vgn-record-state-guid", rcdState.getGuid)
      // Add param-hash header so filter doesn't have to compute it
unnecessarily.
      request.addHeader ("x-vun-param-hash", iMd.qetParamHash)
      send request
      wait for the response with timeout = REGENERATE_TIMEOUT
      if response received && response.isOk,
         placementMsg = response.getPlacementMsg.
         //    PlacementMsgHandler checks regenInstanceId in
         places where regen placement
         //    differs from normal placement. These cases are caused by race
conditions
         //    between different types of expiration events on the same
instance. The
         //    races conditions only occur when the template's
         regenerate-policy
causes
         //    regeneration. For example, if a clear-cache occurs for an
instance that's
         //    already being regenerated due to a template
         update, the regen may or may
         //    not pick up the new clear-cache-id. If the placement handler
sees that a
         //    regen placement's clear-cache-id is old, it restarts the
regeneration,
         //    whereas an old normal placement is just discarded.
         placementMsg.setRegenInstanceId (iMd.getKey)
         send placementMsg to PlacementMsgHandler TaskManager
      else if timeout or response failure == OldTemplate,
         //    Timeout or failure - invalidate the instance.
         iMd.setState (Invalid)
         iMd.setExpirationTimestamp (new Date)
         mdCon.updateInstance (iMd)
      //    Else failure was OldTemplate. That means the PG that received
the
regenerate
         //    did not have the version of the template that caused the request.
Leave the
         //    instance as-is, because a subsequent template-update will be
received from
         //    the AN of the PG that-returned OldTemplate,
         after which requests to that PG
         //    will succeed. So worst case, the request caused by the last AM'S
template-
         //    update is guaranteed that all PGs have the new version of the
template.
// Handles RegenerateMsgs that time out in the Regenerator queue.
queueTimeoutHandler (timedOutInstances : List) for each iMd in
timedOutInstances,
      iMd.setState (Invalid)
      iMd.update
```

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for caching, comprising:
   registering a set of modules;
   evaluating a set of parameters of a request, wherein each parameter is evaluated by a corresponding module;
   creating a signature based on the evaluation of the set of parameters by each of the corresponding modules;
   searching for responsive content in a cache based on the signature; and
   if no responsive content is found in the cache, generating responsive content, storing the responsive content in the cache and storing metadata in conjunction with the responsive content such that the request can be generated from the metadata, wherein the metadata is obtained from the evaluation of one or more of the set of parameters by the corresponding module.

2. The method of claim 1, further comprising receiving a request.

3. The method of claim 2, further comprising delivering the responsive content to an originator of the request.

4. The method of claim 1, further comprising registering a template.

5. The method of claim 4, further comprising associating the request with the template.

6. The method of claim 5, wherein the parameter is defined by the template.

7. The method of claim 6, further comprising
   extracting data related to the parameter from the request; and passing the data to the module.

8. The method of claim 7, wherein the parameter is a query string variable, a client locale, a cookie variable, form data, a Java bean, or a user defined parameter.

9. The method of claim 7, wherein the signature is formed from the module's evaluation.

10. The method of claim 1, wherein the parameter and the module pertain to capabilities of a browser initiating the request.

11. The method of claim 10, wherein the parameter is a user-agent string extracted from a header in the request.

12. The method of claim 11, wherein the module evaluates the capabilities of the browser using an extensible markup language file.

13. The method of claim 12, wherein the extensible markup language file defines a list of rules which map the user-agent string to a list of browser capabilities.

14. The method of claim 13, wherein the list of rules may be expanded.

15. The method of claim 1, further comprising storing template metadata and request metadata in the cache, wherein the template metadata and request metadata are associated with the responsive content.

16. The method of claim 15, wherein the request metadata is formed from the module's evaluation.

17. The method of claim 16, wherein the request metadata is a list or a hash table.

18. A software system for caching, comprising machine or computer readable media containing instructions translatable for:
    registering a set of modules;
    evaluating a set of parameters of a request, wherein each parameter is evaluated by a corresponding module;
    creating a signature based on the evaluation of the set of parameters by each of the corresponding modules;
    searching for responsive content in a cache based on the signature; and
    if no responsive content is found in the cache, generating responsive content, storing the responsive content in the cache and storing metadata in conjunction with the responsive content such that the request can be generated from the metadata, wherein the metadata is obtained from the evaluation of one or more of the set of parameters by the corresponding module.

19. The software system of claim 18, further comprising instructions translatable for receiving a request.

20. The software system of claim 19, further comprising instructions translatable for delivering the responsive content to an originator of the request.

21. The software system of claim 18, further comprising instructions translatable for registering a template.

22. The software system of claim 21, further comprising instructions translatable for associating the request with the template.

23. The software system of claim 22, wherein the parameter is defined by the template.

24. The software system of claim 23, further comprising instructions translatable for extracting data related to the parameter from the request, and passing the data to the module.

25. The software system of claim 24, wherein the parameter is a query string variable, a client locale, a cookie variable, form data, a Java bean, or a user defined parameter.

26. The software system of claim 24, wherein the signature is formed from the module's evaluation.

27. The software system of claim 18, wherein the parameter and the module pertain to capabilities of a browser initiating the request.

28. The software system of claim 27, wherein the parameter is a user-agent string extracted from a header in the request.

29. The software system of claim 28, wherein the module evaluates the capabilities of the browser using an extensible markup language file.

30. The software system of claim 29, wherein the extensible markup language file defines a list of rules which map the user-agent string to a list of browser capabilities.

31. The software system of claim 30, wherein the list of rules may be expanded.

32. The software system of claim 18, further comprising instructions translatable for storing template metadata and request metadata in the cache, wherein the template metadata and request metadata are associated with the responsive content.

33. The software system of claim 32, wherein the request metadata is formed from the module's evaluation.

34. The software system of claim 33, wherein the request metadata is a list or a hash table.

35. A method for caching, comprising:

registering a module capable of evaluating the capabilities of a browser;

evaluating a parameter of a request, wherein the parameter pertains to the capabilities of the browser which initiated the request and is evaluated by the module;

creating a signature based on the evaluation;

searching for responsive content in a cache based on the signature; and generating responsive content and storing it in the cache if no responsive content is found in the cache; and storing metadata in conjunction with the responsive content such that the request can be generated from the metadata, wherein the metadata is obtained from the evaluation of one or more of the set of parameters by the corresponding module.

* * * * *